Figure 1:
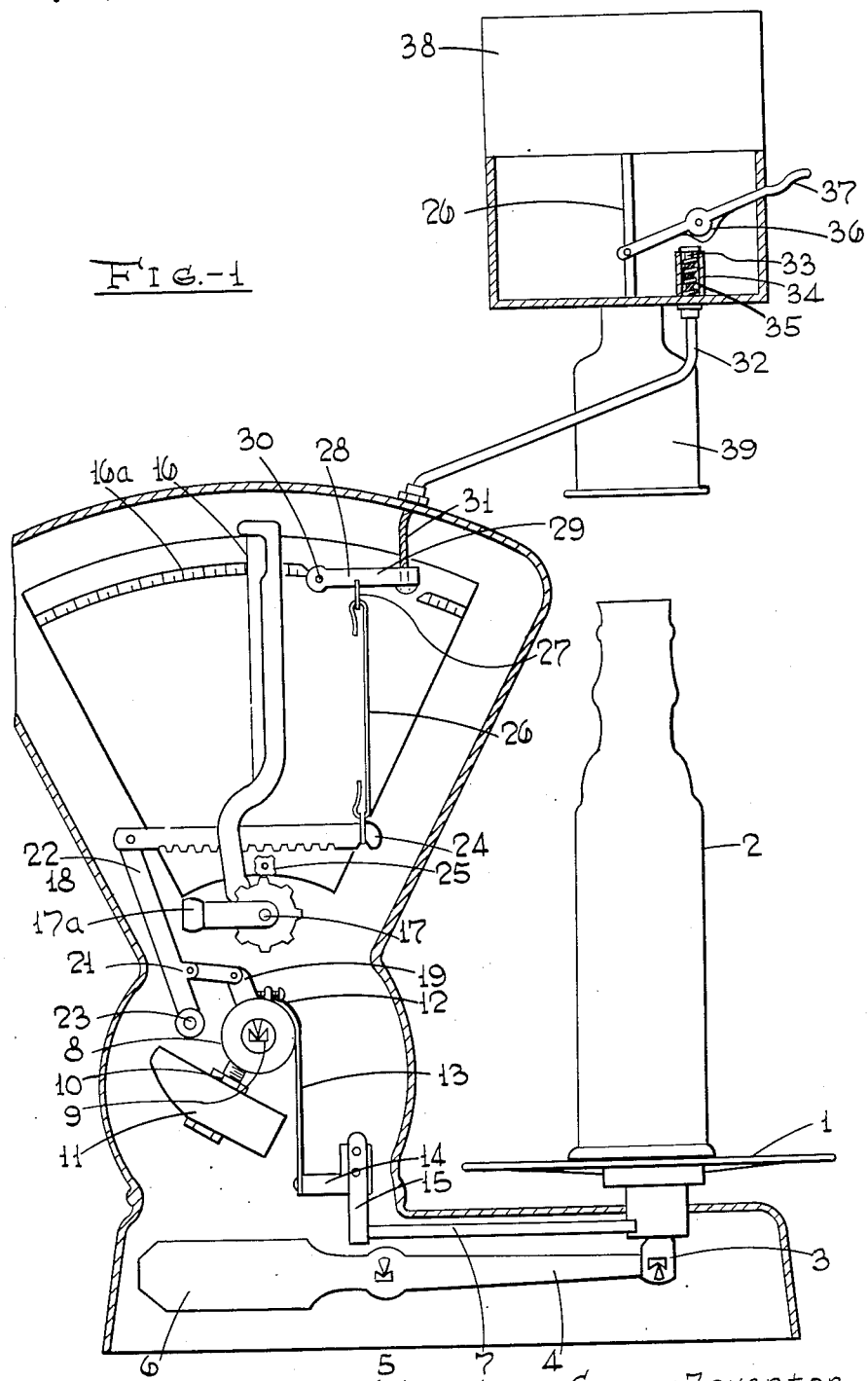

April 10, 1951  A. H. GREGORY  2,548,473
AUTOMATIC WEIGHING MACHINE
Filed July 18, 1946  2 Sheets-Sheet 1

Albion Henry Gregory Inventor
By W. O. T Heilman Attorney

April 10, 1951  A. H. GREGORY  2,548,473
AUTOMATIC WEIGHING MACHINE

Filed July 18, 1946  2 Sheets-Sheet 2

Albion Henry Gregory Inventor
By W. O. T Heilman Attorney

Patented Apr. 10, 1951

2,548,473

UNITED STATES PATENT OFFICE 2,548,473

AUTOMATIC WEIGHING MACHINE

Albion Henry Gregory, London, England, assignor to Standard Oil Development Company, a corporation of Delaware Application July 18, 1946, Serial No. 684,589
In Great Britain July 23, 1945

10 Claims. (Cl. 249—55)

This invention relates to apparatus for weighing the contents filled into containers of varying weight, and for filling predetermined weighed amounts of materials into such containers whilst avoiding the necessity of separately weighing the said containers, and/or separately adjusting the weighing machine to take account of the weight of the container.

The invention also relates to apparatus for filling weighed quantities of contents, for example, viscous liquids such as oils into containers and adapted to interrupt the supply of the said contents automatically upon the required predetermined weight of contents being filled into the said container, and relates particularly to such apparatus in which means are provided to adjust the apparatus automatically to allow for variations in the weights of the said containers without interfering with the means for measuring the weight of the contents filled into the container, and interrupting the supply of contents being filled into the container when the required predetermined weight has been filled into the container.

It has already been known to fill weighed quantities of liquids into containers in an apparatus consisting essentially of an ordinary beam balance, in which the container to be filled is placed on a scale pan under a filling orifice and on the other pan of the balance is placed a weight equal to the weight of an average container, usually a clean container, and the weight of the contents to be filled into the container, and in which an electric switch, for example, a pin dipping into a cup of mercury, is arranged in combination with said balance, whereby when the combined weight of the container and the contents filled thereinto balance the counter weights, the electric switch closes an electric circuit and operates an electric relay which automatically closes a valve in the supply tube to the filling orifice, and interrupts the supply of contents to the said container. The said supply of contents is only resumed on operation of a manual or foot controlled lever when a further container is in position on the scale pan, and the electric circuit broken by opening the switch on unbalancing the scale when the filled container is removed.

This arrangement, while satisfactory in the case of containers such as tin cans, which do not vary very much in weight, has a very serious disadvantage when using containers such as glass bottles, which may vary very considerably in weight from container to container, so that the amount of contents filled into each container will vary according to the variation in the weight of the container being filled from the counterweight.

It has also been the practice in some cases to employ automatic indicator weighing machines, for example, as described in Patent Specification No. 295,432, in which the weight on the scalepan is balanced through a system of levers against counterbalance weight rotating about a spindle and having connected therewith an indicator, e. g. a pointer, moving over a scale to indicate the weight of the material on the scale pan.

In using such apparatus the container was placed on the scale pan under the filling orifice and the scale was adjusted manually until its zero mark coincided with the position of the indicator. The valve in the supply line to the filling orifice was then opened and the contents filled into the container, whereupon the indicator moved over the scale in accordance with the weight of the contents of the container, until it indicated a predetermined weight, when it operated an electric switch which as before, closed an electric circuit which operated an electric relay which closed the valve in the supply tube of the filler orifice.

This, whilst being an improvement on the earlier arrangement, still has the disadvantage that the machine has to be set manually for each container, which entails the expenditure of time and labour, which are of considerable importance when filling large numbers of containers, besides introducing a personal element giving rise to a source of errors.

The present invention attempts to overcome these disadvantages by providing a machine of the above type, in which the adjustment for the weight of the container is made automatically without the need for any manual operation.

According to the present invention an automatic counterbalance weighing machine of the type described is combined with a valved device for supplying material to a container, placed on the scale pan of the weighing machine, in such a way that the indicator mechanism is only engaged with the counterbalance mechanism whilst the material is being filled into the container, and is disengaged from the counterbalance mechanism and returned to its zero position automatically when the valve in the material supply device is closed, and is engaged automatically with the counterbalance mechanism when the said valve is opened, whereby the container may be placed on the scale pan and balanced against the counterbalance mechanism with the indicator at its zero position and, on opening the valve to supply material to the container the indicator is engaged automatically in its zero position with the counterbalance mechanism, and then indicates the weight of material filled into the container independently of the weight of the container itself.

The invention accordingly consists in apparatus for filling predetermined quantities of materials for example liquids such as oils, into containers of varying weight with automatic allowance for the weight of the containers being filled, comprising in combination an automatic counterbalance weighing machine of the type described having indicating means interconnected with the counterbalance mechanism for indicating the weight of material on the scale pan thereof, valved means for supplying material to containers placed on the scale pan of said weighing machine, and automatic means for dis-engaging said indicator means from the counterbalance mechanism and returning it to the zero position, when said valve is closed and automatically re-engaging said indicator, in the zero position, with the counterbalance mechanism when the said valve is opened whereby the indicator only indicates the weight of material filled into the container.

According to one method of carrying the invention into effect, the basis of the machine comprises an automatic indicating weighing machine of the type described in Great Britain Patent Specification No. 295,432. This comprises essentially a scale pan mounted at one end of a lever pivoted about a point along its length, and balanced against a primary counter balance mounted at the other end of the said lever. The said scale pan is also rigidly attached to one end of a bar adapted to move vertically to and fro with the said scale pan, the other end of said bar being connected to a secondary counterweight comprising a drum pivotably mounted at its axis, and having a secondary counterweight in the form of a block of metal adjustably mounted on a threaded rod inserted radially into said drum, the connection between said secondary counterweight and the said bar comprises a flexible metal band passing over said drum, attached at one end to the periphery of the said drum, and at the other end to said bar. The said bar may also be connected via a check link to the frame, to provide for stabilization and avoid the effects of slight vibrations. An indicator arm is normally mounted radially on the said drum and moves over a scale to indicate the weight on the scale pan.

According to one feature of the invention the means for engaging and disengaging the indicator with the counterbalance mechanism comprises a spindle, separate from the spindle of the counterbalance mechanism, an indicator arm on said spindle, a pinion on said spindle positively attached to said indicator and a rack arm co-operating with said spindle and connected through a system of links and levers with the counterbalance mechanism, whereby it moves to and fro in a linear direction in accordance with the movements of the said counter balance mechanism and in turn moves the pinion and therewith the indicator in accordance with the movements of the counterbalance mechanism, and automatic means for moving said rack arm out of engagement with the pinion on closing the valve controlling the supply of material to the container and re-engaging it with the pinion when said valve is opened. The pinion and arm are so balanced as to return the indicator to zero when disengaged from the rack arm.

According to a further feature of the invention, means are also provided to interrupt the supply of material to the container automatically upon a predetermined weight of material being filled into the container.

According to a still further feature of the invention means are provided to initiate automatically the flow of material into the container when the same is placed in position on the weighing machine, whereby the apparatus is made fully automatic on placing the container in position to be filled.

The means for engagement and disengagement of the said rack with the pinion comprise in combination a lever arm mounted above the said rack arm and pivoted at one end about a point on the frame of the machine, and connected from its mid point to the free end of said rack arm preferably by means of a flexible strap, and means connecting the free end of said lever arm with the means for opening and closing the valve in the filling device whereby said lever arm is depressed and therewith the rack is engaged with the pinion on opening the said valve and the said lever is raised and thereby the rack is lifted out of engagement with the said pinion when the said valve is closed.

The means for interrupting the supply of material to the container automatically when the indicator reaches a predetermined position may conveniently be arranged by providing a light switch arm mounted fixedly on the said indicator or spindle, and insulated therefrom, one end of which is permanently connected to one end of an electric circuit, and the other end of which is adapted to contact a contact member at the other end of the said electric circuit and open or close the same when the indicator reaches a predetermined position.

According to a still further feature of the invention the means provided for initiating the supply of material to the container automatically upon placing the container in position on the scale pan under the filling orifice may comprise a switch device operated by the said counterbalance drum and suitably through the medium of the said toothed rack arm and adjusted to close an electric circuit and operate an electric relay which in turn opens the filling valve, when a sufficient weight less than the lightest of the containers is placed on the scale pan.

Such a switch may be conveniently in the form of a bell crank lever or other suitable form of lever pivotally mounted on the frame and having one arm abutting against an abutment provided on said rack arm and having on its other arm an electrical contact member connected to one end of an electric circuit and adapted to be moved into and out of contact with the contact point at the other end of the circuit in accordance with the to and fro movement of the said toothed rack arm co-operating on the other end of the said lever.

Figure 2:
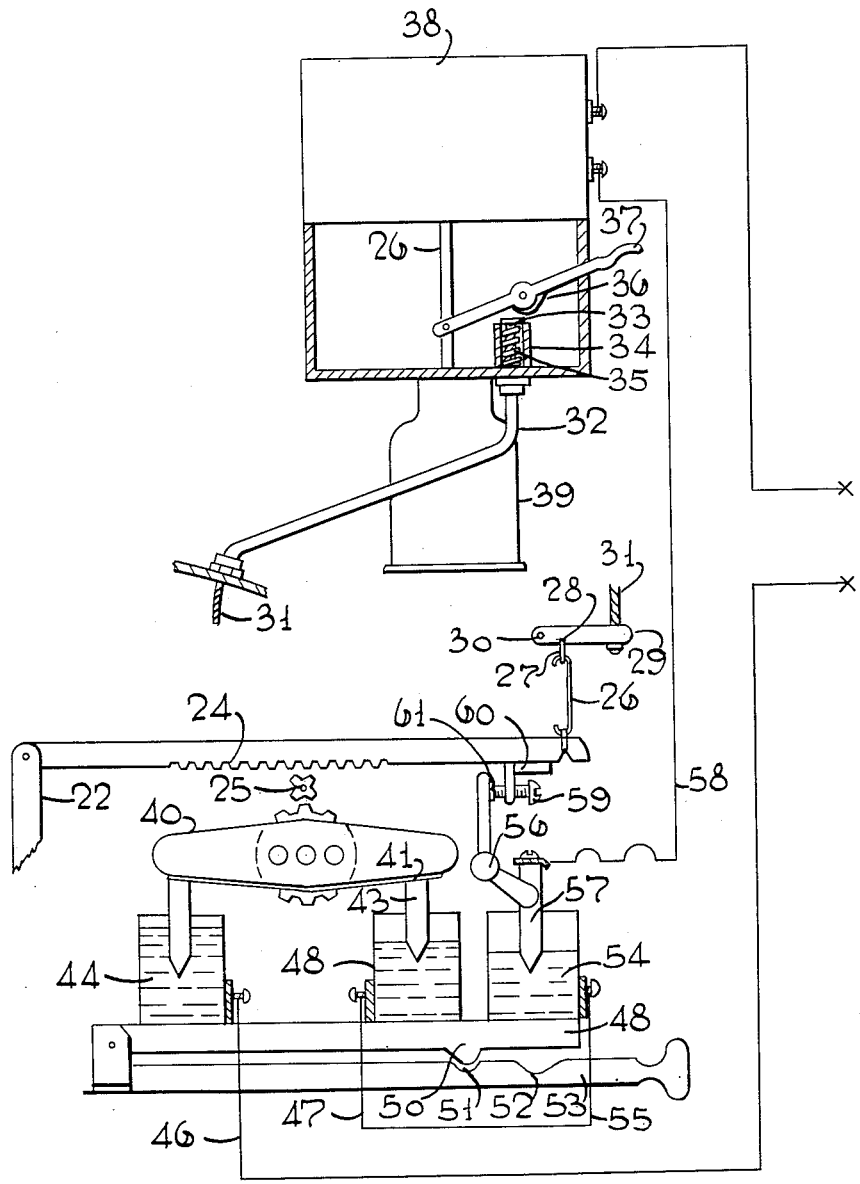

One form of the invention will now be described with reference to the accompanying drawings, in which Fig. 1 shows a weighing machine and filling device, and Fig. 2 shows a detail view of a switch member for opening and closing the electric circuit controlling the filling valve.

Referring to the drawings, 1 represents the scale pan of the weighing machine, and 2 represents the container, for example, a glass bottle. The scale pan 1 is mounted on the knife edge bearing 3 on the lever arm 4, balanced on the knife edge bearing 5, and whose other end is formed as a primary counterweight 6, balancing against the weight of the scale pan and material to be weighed. The scale pan 1 is maintained in a horizontal position by suitable means not shown. 7 represents the horizontal arm fixedly attached at one end to the scale pan 1, and moving in a vertical plane with the scale pan. 8 represents the secondary counterbalance drum mounted on the knife edge bearing 9, and having the radial screw 10 carrying the secondary counterbalance weight 11, the position of which can be adjusted on the screw 10. Attached to this drum 8 at the point 12 is a flexible metal strap 13, the other end of which is attached to a bracket 14, attached to a vertical member 15 mounted upon the free end of the horizontal arm 7. The indicator arm 16 moving over scale 16a is mounted upon a spindle 17 carried in frictionless bearings e. g. a knife edge or pivot bearing not shown, and on which is mounted the pinion wheel 18. Means such as a balance weight 17a may also be mounted on spindle 17 to return the scale arm to a zero position. Mounted on the drum 8 is a lug 19 on which is pivotally mounted a link member 20, the other end of which is pivotally attached to a lug 21 on a lever 22, pivotally mounted on a frictionless bearing 23 preferably of the knife edge or pivot type. At the free end of the lever 22 is pivotally mounted a horizontal rack arm 24 having its lower side toothed to co-operate with the pinion 18 or an intermediate idler pinion 25 engaging with said pinion 18.

The free end of this rack arm 24 is connected by a flexible strap 26 to a link 27 pivoted about a point 28 in a lever 29, pivotally mounted at one end in bearing 30 mounted in the frame of the weighing machine. The free end of the lever 29 is freely connected to one end of a flexible cable 31 freely movable in an outer casing 32 and attached at its other end to a plunger 33 in a dash pot 34 enclosing a compression spring 35. Against the top of this plunger 33 is arranged a cam 36 mounted on a lever 37 which controls the valve not shown in the feed from the reservoir of material to be filled into the containers to the filler orifice not shown in the filler housing 39.

In operation, when the valve in the feed to the filler orifice is closed the spring 35 in the dash pot 34 forces the plunger 33 to its uppermost position and with it the cable 31. The end of the cable 31 then lifts the lever 29 to its uppermost position and thereby via the link 28 and the flexible strap 26, the rack arm 24 is lifted out of engagement with the pinion 18 or idler pinion 25. The container 2 is then placed on the scale pan under the filler orifice in housing 39, and the weighing machine regains its new equilibrium against the counter weights 6 and 11, without the indicator arm 16 being moved from its zero position on the scale 16a. On opening the valve in the supply line automatically as hereinafter described, or by operation of lever 37, the cam 36 engages with the upper end of the plunger 33 and forces the same into the dashpot 34 against the action of the spring 35, and at the same time forces the cable 31 through its outer casing and pushes the lever 29 down or enables it to fall freely under its own weight, owing to disengagement with the enlarged end of the cable 31.

Owing to the provision of the flexible strap 26, the rack arm 24 is now allowed to fall under its own weight into engagement with the idler pinion 25, or the pinion 18 on the indicator arm spindle. On the material being filled into the container its weight depresses the scale pan 1 and with it the arm 7, which through bracket 14 and strap 13, acts on the counterweight drum 8 against the action of counterweight 10, and rotates the drum about its pivot bearing 9 by an amount proportional to the weight added on the scale pan. The lug 19 also rotates with the drum 8 and pulls the lever 22 over via the link 20 and causes the lever to rotate about its pivot pin 33 by an amount proportional to the movement of the drum and thus to the weight added to the scale pan. The movement of this lever 22 about its pivot moves the rack arm 24 in a horizontal direction over the pinion wheel by an amount proportional to the movement of the drum 8, and therefore to the weight added to the scale pan, and the rack on the underside of this arm-coacting with the pinion 18 or idler pinion 25 moves the indicator arm 16 positively about its pivot bearing 17, by an amount proportional to the movement of the drum, and thus shows on the scale 16a the weight of material filled into the container 2.

When the required amount of material has been filled into the container 2 as shown by the indicator arm, the supply valve is closed by lifting lever 37 or automatically as hereinafter described. This action lifts the cam 36 off the head of the plunger 33 which is then forced up under the action of the spring 34 against the pressure of the external air being equalized by the air admitted to the dash pot through the bleeder valve. The plunger 33 acts upon the cable 21, and by means of lever 29 and strap 26 lifts rack arm 24 out of engagement with the pinion 18 or idler pinion 25 with sufficient delay to allow the weight of the column of material between the supply valve and the container to enter the container, and enable the indicator arm to indicate the weight of material filled into the container. The container is then removed and a further container placed in position and the procedure repeated. When the rack arm 24 is elevated, the balance weight 17a returns the scale arm to the zero position.

The weighing machine may also be provided with the usual check links (not shown) attached to a vertical extension of the bar 15 for stabilizing the weighing machine and any other known modifications of machines of this general type.

One convenient arrangement for interrupting the supply of material to the container when a predetermined amount is filled therein is illustrated in Fig. 2, which shows a back view of part of the apparatus shown in Fig. 1.

Using the same reference as before, 17 represents the spindle for the indicator arm, 18 represents the pinion, 25 the idler pinion, and 24 the rack arm. On the spindle 17 is fixed a light arm 40 of insulating material. This may be attached in any convenient manner and in the drawing is shown as attached to the face of the pinion by screws. Along the bottom edge of this arm 40 is arranged a conducting strip 41, and at the ends of which are provided two contact points 42 and 43. Each of the contact points dips into a cup 44 and 45 containing mercury electrically connected by leads 46 and 47 to an electric circuit and forming with the said arm a switch capable of operation with minimum effort and inertia.

The level of the mercury in one of the cups is maintained such that the contact point dipping into the cup is permanently in contact with the mercury, and the level of the mercury in the other cup is arranged such that at the zero position the contact point is in contact with the surface of the mercury, keeping a closed circuit operating a relay keeping the supply valve open. When the indicator arm has moved over to the predetermined weight the contact piece dipping into this cup is lifted above the mercury surface, and opens the electric circuit which operates the electric relay and in known maner automatically closes the valve in the supply line to the filler orifice.

In order to provide for quick adjustment of the closure of the valve for varying the predetermined weights of material to be measured into the containers, the said cups 44 and 45 may be mounted on a platform 48 of insulating material, pivotally mounted about a point 49 and having a cam 50 on its lower surface resting in depressions 51 and 52 of different depths in a sliding bar 53, such depressions being so arranged to adjust the level of the mercury in the cup 45 to the level at which it just contacts the contact point 43, when the indicator arm reaches the appropriate predetermined weight. Instead of the cam and depressions 51 and 52 in bar 53, the platform may be arranged so that its under surface rests on a cam which may be moved to predetermined positions providing the necessary alterations in the positions of the cup 45. Any other suitable light operable switch may be employed in place of the above which is only given as a convenient example.

In addition to the above the apparatus may also be provided with means for opening the supply valve automatically when a bottle is placed on the scale pan under the filling orifice.

One arrangement for this is also shown in Fig. 2. According to this a further cup of mercury 54 electrically connected to the electric circuit controlling the relay operating the filler valve by lead 55 is provided, and above this cup is arranged a bell crank lever 56 of non-electrical conducting material pivotally mounted at 56a and having at the end of the horizontal arm a contact point 57 adapted to dip into and out of the mercury in the cup on operation of the bell crank lever 56, and connected to the other end of the electric circuit by lead 58. The toe of the vertical arm of this lever is provided with a wearing plate 61 arranged to bear against an adjusting screw 59 in a bracket 60 arranged on the underside of lever 24.

In operation the level of the mercury in the cup 54 and the adjusting screw 59 are so adjusted that when the scale pan is empty the contact point 57 is lifted clear of the mercury in cup 54 by the pressure of the screw 59 on the vertical arm of the lever 56. On placing a container on the scale pan the arm 24 is moved horizontally by the movement of the counterbalance drum 8, through the medium of the lever system 19, 20, 21 and 22, and the screw 59 carried in the bracket 60 is also moved in a horizontal direction and allows the bell crank lever 56 to rotate freely about its pivot 56a under the influence of the weight of the contact point 57 and the side arm of the lever 56, so that the contact point 57 contacts the mercury and closes the circuit, thereby opening the valve. At the same time the lever arm 37 is moved down so that the cam 36 forces the plunger 33 into the dash pot 35, thus allowing the rack arm 24 to descend and co-act with the pinion controlling the indicator arm and cut-off switch, which causes the relay to operate and cut off the supply of material to the container when the predetermined amount has been filled into the container. The filled container is then removed and the process repeated automatically on simply placing another empty container on the scale pan.

In fixing the adjustment of the various switches, due allowance must be made for time lags in the operation of the machine, and the switch system for opening the supply valve on placing a container on the scale, is adjusted to close the circuit when a weight less than that of the lightest sample of container is on the scale pan, and the movements are adjusted so that the weighing machine will have reached equilibrium with the container only on the scale, before the arm 24 co-acts with the pinions 18 or 25, and that this arm will be in position to operate the indicator arm before any of the material being filled into the container exerts its weight on the scale pan.

Similarly, the supply cut-off switch must be timed to operate so that the correct weight is filled into the container after the column of material, for example, liquid, between the cut-off valve and the surface of the material in the container at the moment of cut-off has run into the container.

Whilst the above switch mechanism has been described by way of example, any other form of easily operable switch mechanism may be employed and likewise the relays may be arranged to open the valves in known manner, either on opening or closing the switches and circuits.

What I claim is:

1. In combination with supply means for filling a container including a control valve in such supply means and a means to operate said valve, apparatus for selectively weighing the material filled into the container comprising a scale platform mounted in a weighing machine for vertically reciprocal movement therein, said platform adapted to support and position a container to be filled with reference to the supply means, primary and secondary balance weights pivotally supported in said machine counterbalancing the weight of said platform, the container, and the container contents when filled, a calibrated scale in said machine, an indicator arm moveable with reference to the scale to indicate the weight of material filled into a container on said platform, said arm normally at rest in the zero position of said scale, a primary mechanical linkage system operably connecting said arm and the secondary balance weight, whereby motion of the latter may move the indicating arm with reference to the scale, but normally out of engagement with the arm, a second mechanical linkage system connected to said primary linkage system, means actuated by said valve operating means through said second linkage system to engage said primary linkage system with the indicating arm during filling of the container, and to again disengage said elements when the desired weight of filled material is attained, and means for normally maintaining said arm in a zero position with reference to the calibrated scale, and to automatically return the arm to such position after disengagement of the primary linkage system therefrom.

2. Apparatus according to claim 1, in which the primary mechanical linkage system is a pivot mounted drum member, a lug on said drum, a lever member pivotally mounted in spaced relation to said drum and lug, a rack arm pivotally connected to said lever at one end, said arm selectively engageable with a pinion gear member operating said indicating arm, and a link member between said lever and drum lug, whereby arcuate movement of the drum and lug is imparted to said lever and thereby converted to reciprocal movement of the rack.

3. Appartus according to claim 1, in which the second mechanical linkage system comprises a lever pivotally mounted by one end for arcuate movement of the other end, a flexible shaft support for the other end of said lever, a swivel mounted link dependent by one end from said lever, and at the other end similarly engaging a reciprocal rack arm in said primary linkage system, said shaft, lever, and link normally supporting said rack arm from engagement with an actuating pinion on said indicating arm, said shaft engageable at its other end by said valve actuating means upon opening of the valve to remove support from said rack arm permitting engagement with the indicating arm pinion, and spring means at said other end of the shaft to disengage the rack arm through said shaft, lever, and link upon disengagement of said valve actuating means from the shaft.

4. Apparatus according to claim 1 in which the indicating arm and pinion are balanced so as to return the arm to the zero position after disengagement of the primary linkage system.

5. Apparatus according to claim 1 in which the means actuated by said valve actuating means, through said second linkage systems to engage said primary system with the indicating arm during filling of the container is a flexible shaft engaging said secondary system at one end and at the other end a spring actuated piston, said spring actuated piston, shaft and second linkage system normally holding said primary linkage system disengaged from said indicating arm.

6. In an apparatus of the character described including a scale platform, a scale and indicating arm therefor, means for normally maintaining said arm in a zero position with reference to the scale, a primary linkage system, connected to said platform, selectively engageable with said arm, a supply valve operable to control filling of a container on said platform, a secondary linkage system adapted to engage and disengage said primary system with the arm actuated by means to operate said control valve, and electrical means to actuate said control valve operating means according to the weight of material filled into the container, means to energize and de-energize said electrical means, comprising an electrical circuit connected to a source of electrical energy, a gear member in said primary linkage system mounted for arcuately reciprocal movement with said indicating arm, a switch arm mounted on said gear member, and electrical contact means carried by said arm and connected in said circuit to make and break the circuit by reciprocal movement of the gear member and switch arm, thereby energizing and de-energizing said electrical actuating means to operate the control valve and to actuate said secondary linkage system.

7. Apparatus according to claim 6, in which said electrical contact means comprise a contact element at one end of the switch arm in continuous contact in said circuit, a second contact element at the other end of said arm in make and break contact in said circuit whereby upon filling of a container to a predetermined weight said contact is broken to break the circuit deenergizing said electrical actuating means to close said control valve, and means for adjusting said second contact element to control the circuit breaking point according to the weight of material to be filled into a container therefor on said scale platform.

8. Apparatus according to claim 7, in which said contact elements comprise conductor elements dependent from said switch arm at each end thereof, and a container of mercury below each conductor element, the element at one end of the switch arm disposed for continuous contact with a body of mercury in the container adjacent thereto, and the element at the other end of the switch arm disposed for intermittent removal from contact with a body of mercury in the container adjacent said element, by rotation of said gear member and switch arm.

9. Apparatus according to claim 8, and means for adjusting said second contact element to control the circuit breaking point according to the weight of material to be filled into a container therefor on said scale platform, comprising a support for said second element pivotally mounted at one end, a fixed cam element dependent from the other end of the platform, a reciprocally moveable cam element disposed horizontally below said platform in the plane of rotation of the platform about its pivot point, and a series of slotted portions of varying depth in said latter element adapted to engage the element on said platform.

10. In an apparatus of the character described, including a scale platform, a scale and indicating arm therefor, means for normally maintaining said arm in a zero position with reference to the scale, a primary linkage system connected to said platform selectively engageable with said arm, a supply valve operable to control filling of a container on said platform, a secondary linkage system adapted to engage said primary system with the arm actuated by means to operate the control valve, and electrical means to actuate the control valve operating means, means to energize and de-energize said electrical means comprising an electrical circuit connected to said electrical means to actuate the control valve operating means and to a source of electric energy, a gear member in said primary linkage system mounted for arcuately reciprocal movement with said indicating arm, a switch arm mounted on said gear member, a conductor contact element on one end of said arm disposed for continuous contact in said circuit, a second contact element at the other end of said arm disposed for intermittent contact in said circuit and withdrawable therefrom by movement of said linkage system when engaged with said indicating arm and gear member, a third contact element in said circuit in series with the second element disposed for intermittent contact in the circuit and withdrawable therefrom by opposite movement of said linkage system when not engaged with said indicating arm and gear member, whereby upon filling of a container to a predetermined weight, contact of said second element in the circuit is broken to interrupt the circuit de-energizing said electrical actuating means to close said control valve, and upon replacement of an empty container upon the platform the circuit is completely restored through said third element to re-energize the electric actuating means to open said control valve.

ALBION HENRY GREGORY.

REFERENCES CITED

The following references are of record in the file of this patent:

UNITED STATES PATENTS

| Number | Name | Date |
|---|---|---|
| 1,570,300 | Gase | Jan. 19, 1926 |
| 2,173,575 | Binns | Sept. 19, 1939 |

FOREIGN PATENTS

| Number | Country | Date |
|---|---|---|
| 209,897 | Great Britain | Jan 24, 1924 |